United States Patent [19]
Maendel

[11] Patent Number: 5,029,884
[45] Date of Patent: Jul. 9, 1991

[54] TROLLEY

[75] Inventor: Edward Maendel, McGregor, Canada

[73] Assignee: Baker Colony Farms Ltd., McGregor, Canada

[21] Appl. No.: 451,969

[22] Filed: Dec. 18, 1989

[51] Int. Cl.[5] .............................................. B62B 1/06
[52] U.S. Cl. ................................................ 280/47.27
[58] Field of Search ............... 280/47.17, 47.23, 47.24, 280/47.27, 47.28, 47.18; 414/490, 491, 495, 496

[56] References Cited

U.S. PATENT DOCUMENTS 1,342,585  6/1920  Callahan ........................... 280/47.27
2,623,760 12/1952  Fornelius ......................... 280/47.27

FOREIGN PATENT DOCUMENTS 251942 11/1963  Austria .............................. 280/47.27

Primary Examiner—Andres Kashnikow
Assistant Examiner—Richard Camby
Attorney, Agent, or Firm—Adrian D. Battison; Stanley G. Ade; Murray E. Thrift

[57] ABSTRACT

A trolley for loading heavy and bulky loads such as a dead animal is of the two wheel type with an upper portion of the frame extending upwardly from the wheels and a forward portion of the frame projecting downwardly toward the ground and forwardly to engage the load. A separate frame portion carries a hand winch and a pulley so that a cable passes over the pulley and can extend downwardly over a covering sheet on the upper portion of the frame. The separate frame carrying the winch can be moved from a lower position on the rear of the upper frame portion to a raised position above the handles of the upper frame portion. The trolley can simply lift a very bulky load such as a dead animal onto the upper frame portion so that it can be wheeled away through relatively narrow alleyways.

13 Claims, 2 Drawing Sheets

TROLLEY

BACKGROUND OF THE INVENTION

This invention relates to a trolley which is particularly but not exclusively designed for lifting and transporting heavy and bulky objects such as dead animals.

In hog farming operations animals are often maintained in pens inside a barn. In order to maximize the number of pens inside a particular barn, the alley ways and spaces are minimized so that access to a particular pen is often narrow and the pens are of minimum size.

In some cases animals die while kept in the pen and this occurs particularly with sows which are kept for many years in the operation and hence often die while in the pen. The sow which can weigh several hundred pounds is very difficult to lift and even when lifted is very difficult to transport through the relatively narrow access areas to the pen. The only solution in many cases is therefore to cut up the animal in place and to transport the lighter weight separate parts. However, this is of course a very unsavory task and one which the farmer very much wishes to avoid.

SUMMARY OF THE INVENTION

It is one object of the present invention, therefore, to provide a trolley arrangement which is designed and arranged to enable a bulky weight such as a dead animal to be lifted relatively simply and transported without difficulty from the pen for disposal at a remote location.

According to the invention, there is provided a trolley comprising a frame, two wheels mounted on the frame for transportation of the frame across the ground, the frame defining an upper portion extending generally upwardly from the wheels and a forward portion extending generally forwardly from the wheels, handle means at an upper part of the upper frame portion by which the frame can be manually grasped for support of the frame manually by the handle means and on the wheels, a winch mounted on the frame, a cable mounted on the winch such that rotation of the winch draws in the cable, and means guiding the cable so as to extend from an upper part of the upper portion downwardly to the forward portion such that it can pull an object at the forward portion onto the forward portion and upwardly along the upper portion.

Preferably the upper portion includes a covering layer of sheet metal which is bent to define raised sides of ridges along the sides so that the animal is confined to slide longitudinally of the upper portion to be held in position on the trolley without falling to one side.

Preferably the winch and a pulley forming the guiding means are mounted on a separate frame which can be moved from a first position mounted on a rear part of the upper portion with the pulley projecting just over the upper edge of the upper portion to a second position in which the separate frame is raised above the upper portion. In this way the position of the pulley relative to the upper portion can be moved to accommodate larger or smaller animals and to enable the device to be relatively compact in a storage condition and of sufficient extent to accommodate larger animals in the operating condition.

With the foregoing in view, and other advantages as will become apparent to those skilled in the art to which this invention relates as this specification proceeds, the invention is herein described by reference to the accompanying drawings forming a part hereof, which includes a description of the best mode known to the application and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
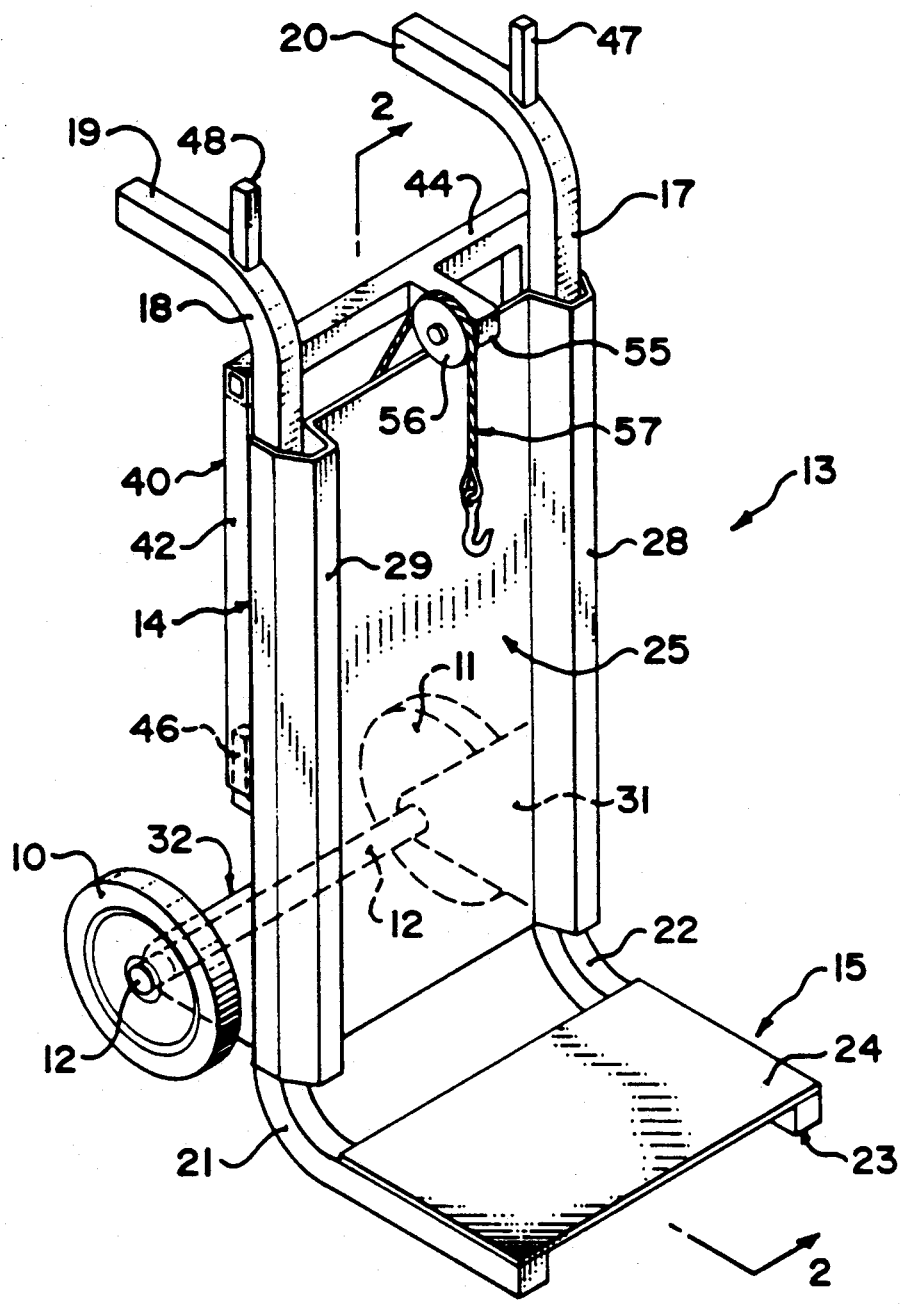
FIG. 1 is an isometric view of a trolley according to the present invention.
Figure 4:
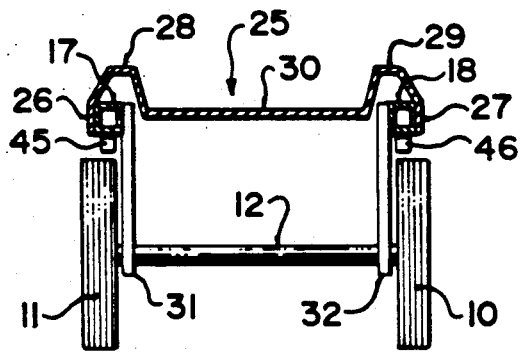
FIG. 4 is a cross sectional view along the lines 4—4 of FIG. 3.

A trolley for lifting and transporting heavy bulky objects such as a dead animal is shown in the drawings and comprises a pair of wheels 10 and 11 mounted upon an axle 12. The ground wheels 10 and 11 are arranged to roll upon the ground and to support a frame structure generally indicated at 13 including an upper frame portion 14 and a lower frame portion 15. The frame structure is defined by a pair of rails 17 and 18 which extend from an upper part of the upper portion at which the rails are curved rearwardly to define handles 19 and 20. The rails from the handles extend substantially vertically downwardly in spaced parallel position to define sides of the frame structure At a lower end, the rails curve forwardly as indicated at 21 and 22 to define the lowest portion of the frame 15 at which the rails extend substantially horizontally forwardly as indicated at 23. The lower portion of the frame is completed by a flat sheet 24 of metal which is attached to the rails at the forwardly extending portion to define a flat platform onto which the load can be drawn The upper portion of the frame is completed by a further sheet of metal generally indicated at 25. The sheet of metal extends from the upper part of the upper portion downwardly to a position adjacent to but spaced from the forward portion of the frame The sheet of metal indicated at 25 includes a pair of rearwardly extending flanges 26 and 27 which are attached to the outer sides of the rails 17 and 18. From the flanges, the sheet is bent to form a pair of forwardly extending ribs 28 and 29 which define sides of the frame and project forwardly in front of the rails 17 and 18. From the ribs there is a flat connecting section 30 which defines the main part of the sheet onto which the load can be drawn with the load being maintained in position on the flat portion by the confining action of the upstanding ribs.

The axle 12 and ground wheels 10 and 11 are connected to the frame by a pair of triangular plates 31 and 32 with the axle 12 substantially at an apex of the triangular plate and an opposed side of the triangular plate attached to the rails 17 and 18 adjacent the lower part thereof just rearwardly of the forward bend 22.

In this way the structure defined forms a trolley arrangement which can be wheeled across the ground with the forward portion of the frame projecting forwardly and the upper portion of the frame inclined slightly rearwardly from the vertical so that the load is supported over the wheels with the user grasping the trolley by the handles and acting to maintain the trolley at the required location while providing a guiding force on the handles.

Figure 2:
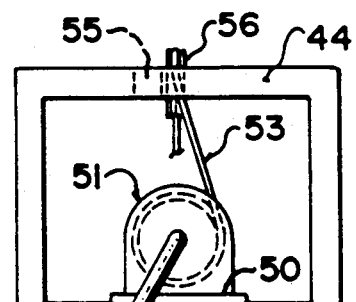
FIG. 2 is a cross sectional view along the lines 2—2 of FIG. 1.
Figure 2:
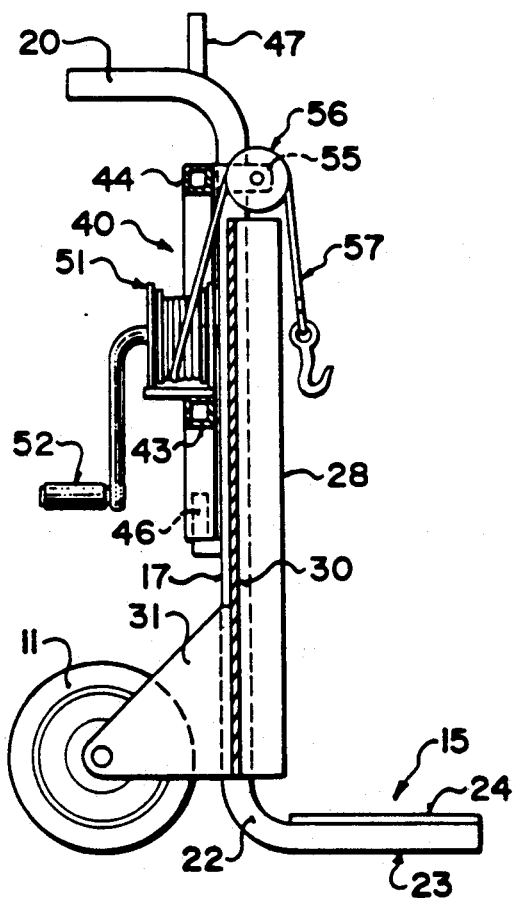
Figure 3:
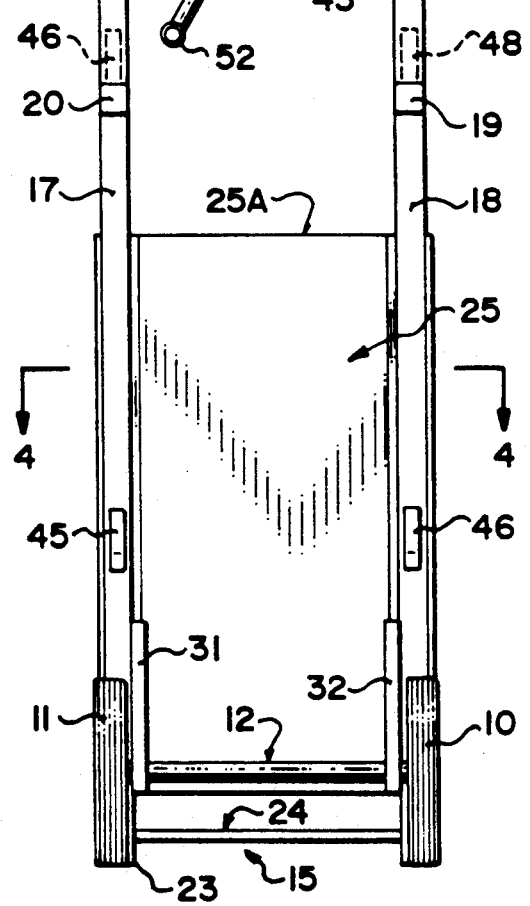
FIG. 3 is a rear elevational view of the trolley of FIG. 1.

The trolley is modified in order to draw onto the frame structure a very bulky, unwieldy and heavy load such as a dead animal. For this purpose there is provided a separate frame structure generally indicated at 40. The frame structure 40 comprises a pair of vertical rails 41 and 42 which are connected into a rigid rectangular structure by transverse struts 43 and 44. The upper strut 44 connects the upper ends of the rails The lower strut 43 connects a lower portion of the rails but at a position spaced from the bottom end of the rails leaving the lower end of the rails exposed and defining an open square section tube with the ends of the rails spaced by a distance equal to the spacing of the rails 17 and 18. The separate frame 40 can therefore be mounted onto the upper portion of the frame by insertion of pins mounted on the upper portion of the frame into the open tubes at the lower end of the additional frame. Two pairs of such pins are provided. A first pair indicated at 45 and 46 is connected to a rear face of respective ones of the rails 17 and 18 so as to project upwardly there along. The pins lie substantially parallel to the rear face but spaced slightly therefrom by sufficient distance so that the separate frame 40 can be inserted over the pins to stand at a position parallel to the rear side of the rails 17 and 18 as best shown in FIG. 2. A second pair of the pins indicated at 47 and 48 is mounted on the rails 17 and 18 adjacent the handles 19 and 20 and projecting upwardly therefrom at a position substantially parallel to and aligned with the rails 17 and 18. The second position of the frame 40 is thus shown in FIG. 3 in which the frame 40 is mounted on top of the upper portion of the frame and extends upwardly therefrom as an extension of the upper frame portion.

On top of the middle strut 43 is mounted a plate 50 which carries a winch 51 manually operable by a handle 52. The winch is arranged to draw in a cable 53 by operation of the handle 52 which projects outwardly from the additional frame 40 and is available at the rear face of the additional frame 40 for rotation about a horizontal axis forwardly of the additional frame 40.

The upper strut 44 carries a forwardly extending bracket 55 which carries a pulley 56. The length of the bracket is such that the pulley 56 projects forwardly from the upper frame over and slightly in front of the top edge of the sheet 25 so that a cable running over the upper surface of the pulley can hang down along the front face of the sheet 25 as indicated at 57. Thus in the lower position shown in FIG. 2 the pulley is directly over the top edge of the sheet. In the position shown in FIG. 3, the pulley is raised by a distance of the order of thirty inches to a position well above the handles and well above the top edge 25A of the sheet 25.

The device can therefore be used with the additional frame 40 in either position as required depending upon the size of the load to be drawn onto the trolley. In operation the forward frame portion of the trolley is drawn up against the load to be pulled onto the trolley and then the hook is suitably attached to the load. The winch is then operated to draw the hook upwardly toward the pulley so that the load is drawn over the front portion of the frame and then slides along the sheet 25 confined against falling sidewardly by the ribs 29 and 28. The trolley is relatively small and simple to maneuver in relatively narrow alleyways and yet can lift a heavy load and maintain the load located on the trolley without excessive manual effort.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A trolley comprising a frame, two wheels mounted on the frame for transportation of the frame across the ground, the frame defining an upper portion extending generally upwardly from the wheels and a forward portion extending generally forwardly from the wheels, handle means at an upper part of the upper frame portion by which the frame can be manually grasped for support of the frame manually by the handle means and on the wheels, a winch mounted on the frame, a cable mounted on the winch such that rotation of the winch draws in the cable, and means guiding the cable so as to extend from an upper part of the upper portion downwardly to the forward portion such that it can pull an object at the forward portion onto the forward portion and upwardly along the upper portion, the upper portion including a sheet extending thereover so as to define a substantially closed surface for supporting the object, and the upper portion including a pair of ribs extending forwardly therefrom each at a respective side thereof for defining a channel-shaped portion for confining the object on the upper portion.

2. The invention according to claim 1 wherein the forward portion includes a sheet lying thereon and defining a substantially closed surface for supporting the object.

3. The invention according to claim 1 wherein the guiding means comprises a pulley.

4. The invention according to claim 3 wherein the winch is arranged for mounting rearwardly of the upper portion and wherein the pulley projects forwardly from an upper edge of the upper portion for guiding the cable over the upper edge and downwardly along the upper portion.

5. The invention according to claim 4 wherein the pulley is mounted upon a bracket projecting forwardly from the upper edge of the upper portion and defining an axis of rotation of the pulley lying transverse to the upper portion.

6. The invention according to claim 1 wherein said winch and said guiding means are mounted upon a separate frame portion which is separate from said upper frame portion and said forward frame portion.

7. The invention according to claim 6 wherein the separate frame portion is moveable from a first position in which the guiding means is arranged immediately above an upper edge of the upper portion to a second position in which the guiding means is arranged at a raised position above the first position.

8. The invention according to claim 7, wherein the separate frame includes at a lower end thereof a pair of sleeves each for receiving a pin mounted on the upper frame portion and wherein the upper frame portion includes two pairs of pins with the first pair of pins mounted on a rear face thereof for supporting the separate frame in the first position thereof and a second pair of pins being mounted at an upper edge of the upper portion for supporting the separate frame in the raised position.

9. The invention according to claim 8 in which the separate frame comprises a pair of vertical legs each having an open lower end defining a sleeve for receiving a pin mounted upon the upper frame portion and a pair of cross members connecting the legs with a first cross member at a top of the legs and a second cross member below the first cross member, the first cross member mounting said guide means and the second cross member mounting said winch.

10. A trolley comprising a frame, two wheels mounted on the frame for transportation of the frame across the ground, the frame defining an upper portion extending generally upwardly from the wheels and a forward portion extending generally forwardly from the wheels, handle means at an upper part of the upper frame portion by which the frame can be manually grasped for support of the frame manually by the handle means and on the wheels, a winch mounted on the frame, a cable mounted on the winch such that rotation of the winch draws in the cable, and means guiding the cable so as to extend from an upper part of the upper portion downwardly to the forward portion such that it can pull an object at the forward portion onto the forward portion and upwardly along the upper portion, and a winch frame portion separate from said upper portion and said forward portion on which said winch and said guiding means are mounted, the winch frame portion comprising a pair of vertical legs each having an open lower end defining a sleeve for receiving a pin mounted upon the upper frame portion and a pair of cross members connecting the legs with a first cross member at a top of the legs and a second cross member below the first cross member, the first cross member mounting said guide means and the second cross member mounting said winch.

11. A trolley comprising a frame, two wheels mounted on the frame for transportation of the frame across the ground, the frame defining an upper portion extending generally upwardly from the wheels and a forward portion extending generally forwardly from the wheels, handle means at an upper part of the upper frame portion by which the frame can be manually grasped for support of the frame manually by the handle means and on the wheels, a winch mounted on the frame, a cable mounted on the winch such that rotation of the winch draws in the cable, and means guiding the cable so as to extend from an upper part of the upper portion downwardly to the forward portion such that it can pull an object at the forward portion onto the forward portion and upwardly along the upper portion, and a winch frame portion separate from said upper portion and said forward portion on which said winch and said guiding means are mounted, wherein the winch frame portion is movable from a first position in which the guiding means is arranged immediately above an upper edge of the upper portion to a second position in which the guiding means is arranged at a raised position above the first position.

12. The invention according to claim 11 wherein the winch frame includes at a lower end thereof a pair of sleeves each for receiving a pin mounted on the upper frame portion and wherein the upper frame portion includes two pairs of pins with the first pair of pins mounted on a rear face thereof for supporting the separate frame in the first position thereof and a second pair of pins being mounted at an upper edge of the upper portion for supporting the separate frame in the raised position.

13. The invention according to claim 12 in which the winch frame comprises a pair of vertical legs each having an open lower end defining a sleeve for receiving a pin mounted upon the upper frame portion and a pair of cross members connecting the legs with a first cross member at a top of the legs and a second cross member below the first cross member, the first cross member mounting said guide means the second cross member mounting said winch.

* * * * *